May 31, 1927.                              1,630,473
P. DUCONDU
LOADING AND UNLOADING DEVICE FOR VEHICLES
Filed Oct. 18, 1924        2 Sheets-Sheet 1
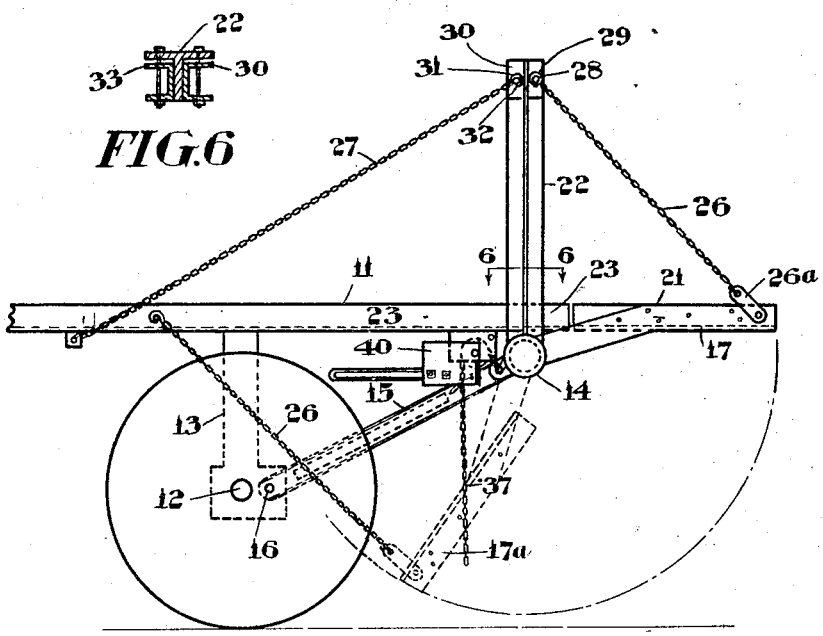
FIG.6
FIG.1
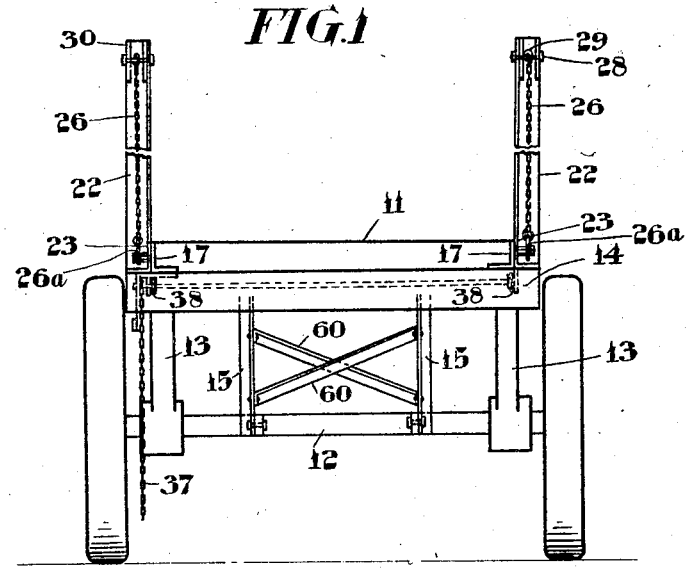
FIG.2
INVENTOR
PAUL DUCONDU
BY Fetherstonhaugh & Co
ATTORNEYS May 31, 1927.  1,630,473
P. DUCONDU
LOADING AND UNLOADING DEVICE FOR VEHICLES
Filed Oct. 18, 1924  2 Sheets-Sheet 2
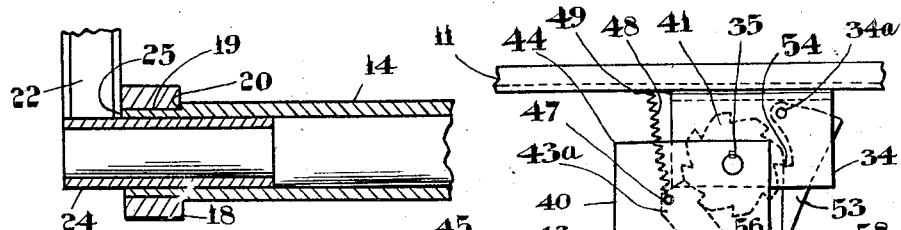
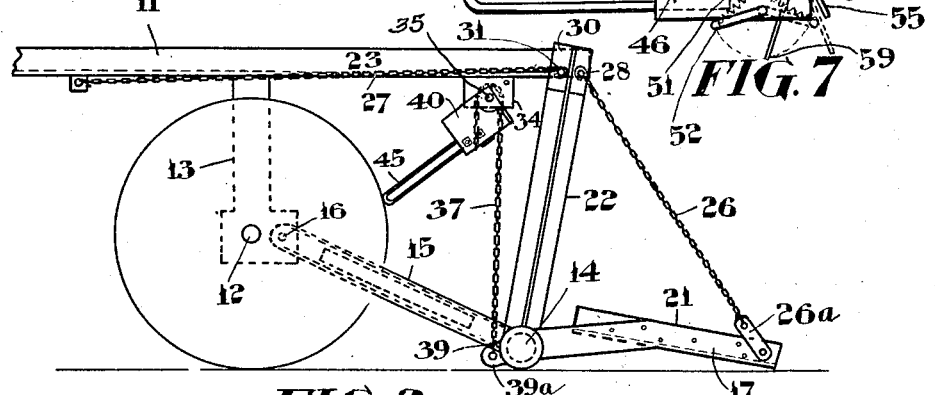
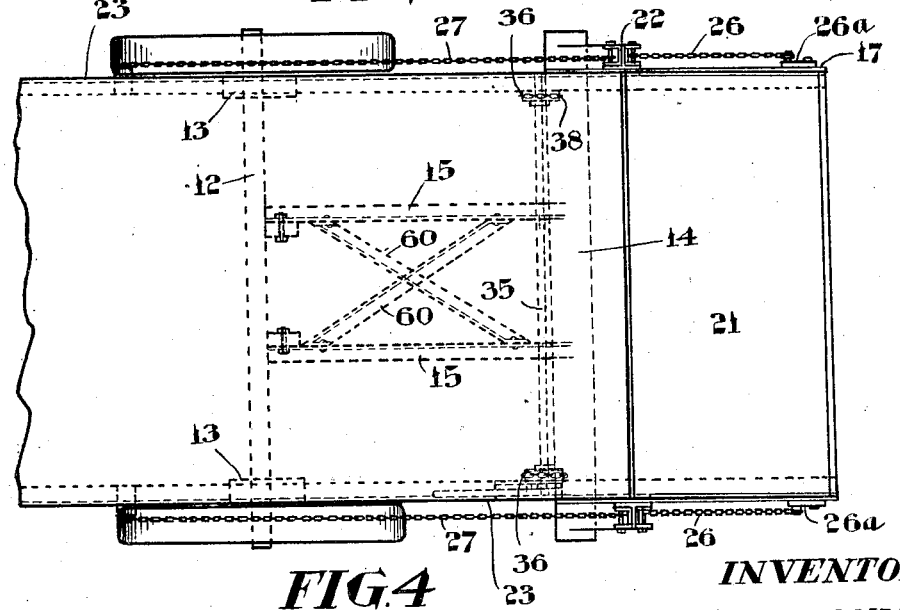
INVENTOR
PAUL DUCONDU
BY Fetherstonhaugh & Co
ATTORNEYS Patented May 31, 1927.

1,630,473

UNITED STATES PATENT OFFICE.

PAUL DUCONDU, OF MONTREAL, QUEBEC, CANADA.

LOADING AND UNLOADING DEVICE FOR VEHICLES.

Application filed October 18, 1924. Serial No. 744,382.

This invention relates to new and useful improvements in unloading devices for vehicles and the object of the invention is to provide a simple, durable and easily operated attachment for vehicles to facilitate the loading and unloading of heavy or bulky objects.

A further object is to provide a device of the class stated which will be easily attached to any of the standard types of trucks.

In my invention I provide a loading platform which may be hingedly attached to a fixed portion on the underside of a truck. The attachment is arranged so that the platform may be lowered to receive heavy or bulky objects. A self locking hoisting unit is provided for raising or lowering the loading platform, which may be tied to the underside of the main body of the truck when not in use or when the truck is travelling.

In the drawings:

Figure 1 is a side elevation of the loading platform in the raised position.

Figure 2 is an end view of the truck with the platform in the raised position.

Figure 3 is a side elevation of the loading platform in the lowered position.

Figure 4 is a plan view of the device.

Figure 5 is a sectional elevation of one end of the hollow tubular member showing the method of attaching the vertical supports and platform supports.

Figure 6 is a sectional plan of the vertical supports taken on the line 6—6 Figure 1.

Figure 7 is a side elevation of one form of hoisting unit which may be used.

Referring more particularly to the drawings, 11 designates the floor of a vehicle body provided with a rear axle 12 connected in any suitable manner to the body by means of the frame 13. A hollow circular member 14 is attached to the body of the vehicle or the frame 13 by means of the links 15, each hingedly connected at one end 16 to the frame 13 and connected in any suitable manner at the opposite end to the member 14. The loading platform supports 17 are provided with bearings 18, which are rotatably mounted on the reduced portion 19 formed at each end of the member 14. The brackets engage with the shoulders 20 to prevent lateral movement of the loading platform 21, which may be bolted or otherwise secured to the supports 17. Slidably mounted in the ends of the tubular member are the arms or struts 22, which are so positioned that they clear the side edges 23 of the floor 11, and can be lowered to lie horizontally against said edges when not in use. The arms are secured to hollow spindles 24, which are rotatably mounted and project into the tubular member 14. The lower portions of the arms engage with the ends 25 of the tubular member to prevent movement of the arms toward one another. To hold the platform rigidly in position when in operation, tying members 26 and 27 are provided and may consist of chains (as illustrated) or wire ropes or rigid bars. The members 26 are attached to the end of the platform supports by means of the links $26^a$, and are provided with hooks 28 which engage with the pins 29 passing through channel members 30 secured to the top of the arms 22. The tying members 27 are secured at one end to the body of the vehicle by any suitable means and to the top of the arms 22 by means of the pins 32 passing through the links 31 and the channel members 33 secured to the arms 22. It will be readily understood that modifications may be made in the attachments for the tying members, as the means disclosed are for illustrative purposes only. The preferred form of hoisting mechanism is shown in Figures 1, 2, 3, 4 and 7 and is mounted to clear all fixtures on the underside of the truck. The hoisting mechanism is secured to the underside of the truck body by means of the brackets 34 situated near the outer edges of the flooring, as shown. Rotatably mounted in the bearings 34 is the hoisting spindle 35, which extends from side to side of the vehicle and to which are secured the chain sprockets 36 one at each end of the spindle, in close proximity to the bearings 34. Passing over the sprockets are the hoisting chains 37, the links of which engage with the teeth or pockets 38 formed in the faces of the sprockets. One end 39 of each chain is secured to the lugs or eyebolts $39^a$ fastened to the member 14. The hoisting spindle is operated by the pawl and ratchet mechanism, designated as a whole by reference numeral 40. Keyed or otherwise secured to the spindle is the ratchet wheel 41 positioned near one end of the spindle. The hoisting pawl $43^a$ is oscillatably mounted on a pin 43 passing through two plates 44, which are rotatably mounted on the spindle 35. The plates are mounted one on each side of the ratchet wheel and an operating handle 45 is secured to the plates by means of the bolts 46. The end of the handle, through which the bolts pass, is placed between the plates to form a distance piece. The end 47 of the hoisting pawl is so formed that it engages with the teeth of the ratchet wheel and is brought into contact with the said teeth by means of the tension spring 48 only when lowering. One end of the spring 48 is secured to the end 47 of the pawl and the other end to a bar 49 attached to the underside of the truck or to the bracket 34. The other end 50 of the hoisting pawl extends slightly beyond the pivot pin 43 and a tension spring 51 is attached to this end. One end of this spring is attached to a pivotally mounted pin or bar 52 attached to the plates. This pin or bar, when placed in the position shown in Figure 7, exerts a pull on the pawl through the medium of the spring 51, which tends to hold the end 47 of the pawl in contact with the teeth of the ratchet wheel. In lowering, the bar 52 is manually placed in the position shown in dotted lines and the spring 51 pulls on the end of the hoisting pawl in such a manner that the end 47 is pulled out of contact with the ratchet wheel teeth when the tension on the spring 48 is reduced by raising the handle 45. The holding pawl 53 is pivotally mounted on the bracket 34 in such a manner that the pin 34ª is supported on each side of said pawl. The portion 54 is thrown into engagement by its own weight, the centre of gravity of said holding pawl being so positioned that the pawl tends to fall toward the centre of the ratchet wheel. A spring 55 is wound around a pin 56 passing through the plates. One end 57 of this spring is positioned to engage with the projection 58 of the holding pawl and the other end 59 is adapted to engage with the bar 52 in a special manner hereinafter described in the operation of the device. The hoisting mechanism is mounted to clear all obstacles on the underside of the truck. Lateral bracing members 60 are secured to the links 15 to reduce to a minimum any side-swaying motion of the attachment.

Modifications may be made in the construction of the device without departing from the spirit of the invention. Such modifications may be made by substituting any of the well known types of hoisting mechanisms for the type shown. It may also be stated that the arms 22 and the member 14 may be made in one piece and constructed of any suitable sections.

The operation of the device is very simple. The load is supported on the platform, which is supported at one end by the member 14, said member being hingedly attached to the body of the truck by the links. The other end of the platform is held in the approximate horizontal position by means of the tying members 26 and 27 and the supporting arms 22, which are rotatably mounted in the ends of the member 14. The arms 22 are held in the vertical position by the chains 27, one end of each of said chains being secured to the body of the truck and the other end to the top of the arms. The platform is held in position by the chains 26, one end of each chain being secured to the cantilevered end of the platform and the other end to the top of the arms. The arms form struts for resisting the resultant forces exerted by the pull on the chains or tension members due to the loading of the platform. The platform is raised or lowered by means of the hoisting unit. The hoisting chains are connected to the member 14 and are raised or lowered by means of the rotary movement of the sprockets secured to the hoisting spindle. Movement is imparted to the spindle by means of the ratchet form of hoisting unit 40. In hoisting, the hoisting pawl engages with the ratchet teeth and the handle is pushed downwardly until the holding pawl engages with the teeth of the ratchet wheel. When the handle is moved in the upward direction, the pawl rides over the ratchet teeth. In lowering, the bar 52 is placed in the position shown in dotted lines in Figure 7, so that the tension in the spring 51 tends to pull the hoisting pawl out of engagement with the ratchet teeth. The handle is moved in the downward direction and takes the load off the holding pawl, which is thrown out of engagement with the teeth by the spring 55. The handle is then raised with the load supported on the hoisting pawl until the spring 55 allows the holding pawl to engage with the next tooth. The load is then taken from the hoisting pawl, which is thrown out of engagement with the ratchet teeth by means of the spring 51. The handle is then moved in the downward direction, until the tension in the spring 48 overcomes the tension in the spring 51 and pulls the attached pawl into engagement with the ratchet teeth. The above operation is repeated in lowering and the load is gradually lowered by turning the hoisting shaft through an angle equal to the angle formed between two of the ratchet teeth. If the load is bulky and extends beyond the edges of the loading platform, the arms 22 may be pulled outwardly to allow the load to be rolled or pushed on to the floor of the truck. When the truck loading device is not in use, the arms 22 being rotatably mounted on the member 14, may be folded inwardly to lie in the horizontal direction, and may be secured by any suitable means to the truck body. The loading platform, being also rotatably mounted on the member 14, may be turned or swung into the position shown in dotted lines in Figure 1. The chain 26 shown in dotted lines in Figure 1 may be used to hold the platform under the truck when not in use. It will also be easily seen that the platform, being rotatably mounted on the member 14, may be swung into the vertical position and used as a gate when the truck is travelling.

Having thus described my invention, what I claim is:—

1. A loading device for vehicles, comprising in combination with a vehicle floor, a cantilever structure including a central supporting member, a link connection between the supporting member and the vehicle, a load bearing platform, platform supporting members projecting from the central supporting member, and tension members between the platform supporting member and the central member and between the central member and the floor of the vehicle.

2. A loading device for vehicles comprising the combination with a vehicle floor of a U-shaped member adapted to embrace the vehicle floor, rigid link connection between the U-shaped member and the vehicle, tying members between the vehicle and the extremities of the U-shaped member, a load bearing platform connected to the U-shaped member, connection between said platform and said U-shaped member toward the extremities thereof, and hoisting connection between the lower end of the U-shaped member and the vehicle.

3. A loading device for vehicles, comprising the combination with a vehicle floor of a cantilever structure including a U-shaped strut member, link connection between the lower central part of the U-shaped member and the vehicle, flexible link connection between the upper ends of said U-shaped member and the vehicle, a load bearing platform supported at one edge at the central part of the U-shaped member having link connection with the vehicle, link connection between the opposite edge of the platform and the strut member adjacent the flexible linkage thereof with the vehicle, and hoisting connection between the lower end of the strut member and the vehicle.

4. A loading device for vehicles comprising the combination with a vehicle floor of a cantilever structure comprising a centre strut, a bottom chord including a pair of rigid members each hingedly connected at one end to the lower end of the strut, one of said chord members being hingedly connected at its opposite end to the vehicle and a top chord comprising flexible members connected between the free end of the bottom chord and the center strut near the top thereof, and between the center strut near the top thereof and the vehicle, and a hoisting appliance connected between the bottom of the strut and the vehicle.

5. A loading device for vehicles, comprising the combination with a vehicle of a cantilever structure comprising a strut, a jointed bottom chord and a flexible top chord connected at remote points to the strut and connected together at the free end of the structure, the opposite ends of said chords being hingedly connected at remote points to the vehicle, and a hoisting appliance connected between the bottom chord and the vehicle.

6. A loading device for vehicles, comprising the combination with a vehicle, a cantilever structure anchored at one end to the vehicle and including on each side a bottom chord, a top chord and a strut connected between said chords intermediate the ends thereof, a transverse member spacing the bottom chords apart, sway bracing holding the structure against lateral movement, a hoisting appliance connected between the bottom chord and the vehicle, and a loading platform carried by the unanchored end of the structure.

7. A device according to claim 6, in which the bottom chord is hinged and the top chord separable therefrom to permit movement of the outer portion of the bottom chord and the loading platform to a position under the inner part of the chord, said top chord being reconnectable to hold the loading platform in such unswung position.

8. A loading device for vehicles comprising in combination with a vehicle floor, an attachment including a hollow circular member, links secured to the hollow member and rotatably attached to the body of the vehicle, vertically disposed side arms rotatably mounted in the hollow member, and means for attaching the arms to the body of the vehicle.

9. A loading device for vehicles comprising, in combination with a vehicle floor, an attachment including a hollow member extending in the transverse direction of the floor, links secured to the hollow member and hingedly attached to the body of the vehicle, a loading platform rotatably attached to the hollow member, arms rotatably attached to the hollow member, flexible means for attaching the loading platform to the arm, and flexible means for attaching the arms to the body of the vehicle.

10. A loading device for vehicles comprising, in combination with a vehicle floor, an attachment including a hollow member extending across the back of the vehicle, links hingedly connecting the hollow member with the body of the vehicle, a platform rotatably secured to the hollow member, arms secured to the hollow member, flexible means for securing the arms to the body of the vehicle, means for securing the platform to the arms and a hoisting unit secured to the body of the vehicle for raising or lowering the attachment.

11. A loading device for vehicles comprising in combination with a vehicle floor, an attachment including a hollow member extending across the back of the vehicle, means for hingedly connecting the hollow member with the body of the vehicle, platform supporting members rotatably attached to the hollow member, struts slidably and rotatably attached to the hollow member, flexible means for attaching the arms to the body of the vehicle, and flexible means for attaching the platform supporting members to the arms, and hoisting means secured to the body of the vehicle for raising and lowering the attachment.

12. A loading device for vehicles comprising, in combination with a vehicle floor, an attachment including a hollow circular member extending across the rear of the vehicle, links hingedly connecting the hollow member with the body of the vehicle, a platform rotatably mounted on the circular member, arms rotatably mounted in the ends of the member, channels secured to the upper end of the arms, pins passing through the said channels, flexible members secured to the body of the vehicle and detachably secured to the pins passing through the channels, flexible members secured to the platform and detachably secured to the pins passing through the channels, and a self-locking hoisting unit secured to the underside of the floor, said unit being used for raising or lowering the attachment.

13. A loading device for vehicles comprising in combination with a vehicle floor, an attachment comprising a hollow circular member, means for hingedly securing the hollow member to the body of the vehicle, a loading platform rotatably mounted on the hollow member, arms mounted in the ends of the hollow circular member, flexible means securing the free end of the platform to the upper ends of said arms, flexible means attaching the said upper ends of the arms to the floor of the truck, a hoisting spindle rotatably mounted on the underside of the floor, sprockets mounted on the spindle, hoisting chains secured to the hollow member and engaging with the sprockets, and a double pawl and ratchet wheel hoisting unit for operating the sprockets.

In witness whereof, I have hereunto set my hand.

PAUL DUCONDU.